United States Patent
Frederick et al.

(10) Patent No.: US 6,860,997 B1
(45) Date of Patent: Mar. 1, 2005

(54) APPARATUS AND METHOD FOR PROCESSING ORGANIC MATERIALS

(75) Inventors: Jesse D. Frederick, Bakersfield, CA (US); Mary Jane Wilson, Bakersfield, CA (US)

(73) Assignee: San Joaquin Valley Renewables

( * ) Notice: Subject to any disclaimer, the term of this patent is extended or adjusted under 35 U.S.C. 154(b) by 0 days.

(21) Appl. No.: 10/678,404

(22) Filed: Oct. 3, 2003

(51) Int. Cl.$^7$ ............................................. C02F 3/28
(52) U.S. Cl. .................. 210/603; 210/259; 210/260; 210/908
(58) Field of Search ................................ 210/603, 612, 210/175, 252, 259, 260, 908; 71/10; 423/243.01

(56) References Cited

U.S. PATENT DOCUMENTS

| | | | |
|---|---|---|---|
| 4,022,665 A | 5/1977 | Ghosh et al. | |
| 4,208,279 A | 6/1980 | Varani | |
| 4,252,901 A | 2/1981 | Fischer et al. | |
| 4,274,838 A | 6/1981 | Dale et al. | |
| 4,372,856 A | 2/1983 | Morrison | |
| 4,551,243 A | 11/1985 | Martin | |
| 4,750,454 A | 6/1988 | Santina et al. | |
| 4,845,034 A | 7/1989 | Menger et al. | |
| 4,885,094 A | 12/1989 | Srinivasan et al. | |
| 5,096,579 A | 3/1992 | Jordan et al. | |
| 5,403,742 A | 4/1995 | Freeman | |
| 5,525,229 A | 6/1996 | Shih | |
| 5,746,919 A | 5/1998 | Dague et al. | |
| 6,254,775 B1 | 7/2001 | McElvaney | |
| 6,299,774 B1 | 10/2001 | Ainsworth et al. | |
| 6,444,124 B1 * | 9/2002 | Onyeche et al. | ............ 210/603 |
| 6,503,394 B1 | 1/2003 | Hoyt | |
| 6,521,129 B1 | 2/2003 | Stamper et al. | |
| 6,569,331 B2 | 5/2003 | Raeyes | |
| 6,569,332 B2 | 5/2003 | Ainsworth et al. | |
| 2003/0075501 A1 | 4/2003 | Wilkie | |

FOREIGN PATENT DOCUMENTS

JP 62-160183 * 7/1987

* cited by examiner

*Primary Examiner*—Fred G. Prince
(74) *Attorney, Agent, or Firm*—James M. Duncan

(57) ABSTRACT

A method and apparatus for processing organic materials by anaerobic digestion is disclosed. The apparatus comprises a first covered fluid container, such as a retention pond covered with an oxygen impervious membrane. An aqueous slurry comprising anaerobically digestible fiber is disposed within the first container. A second covered container is disposed within or adjacent to the first container. The second covered container comprises a second upper section and a second lower section. An fluid inlet in the second upper section receives fluid flow from the first container, where a screen is disposed between the first container and the second container, across the fluid inlet. The fluid flow across the screen causes the formation of a filter cake on the screen as fluid flows across the screen, allowing for filtration of the aqueous slurry, and separation of liquids and gas as those components enter the second container. Each apparatus unit may be considered a module. A digester system may be formed by connecting a plurality of the modules together in parallel or in series.

76 Claims, 9 Drawing Sheets

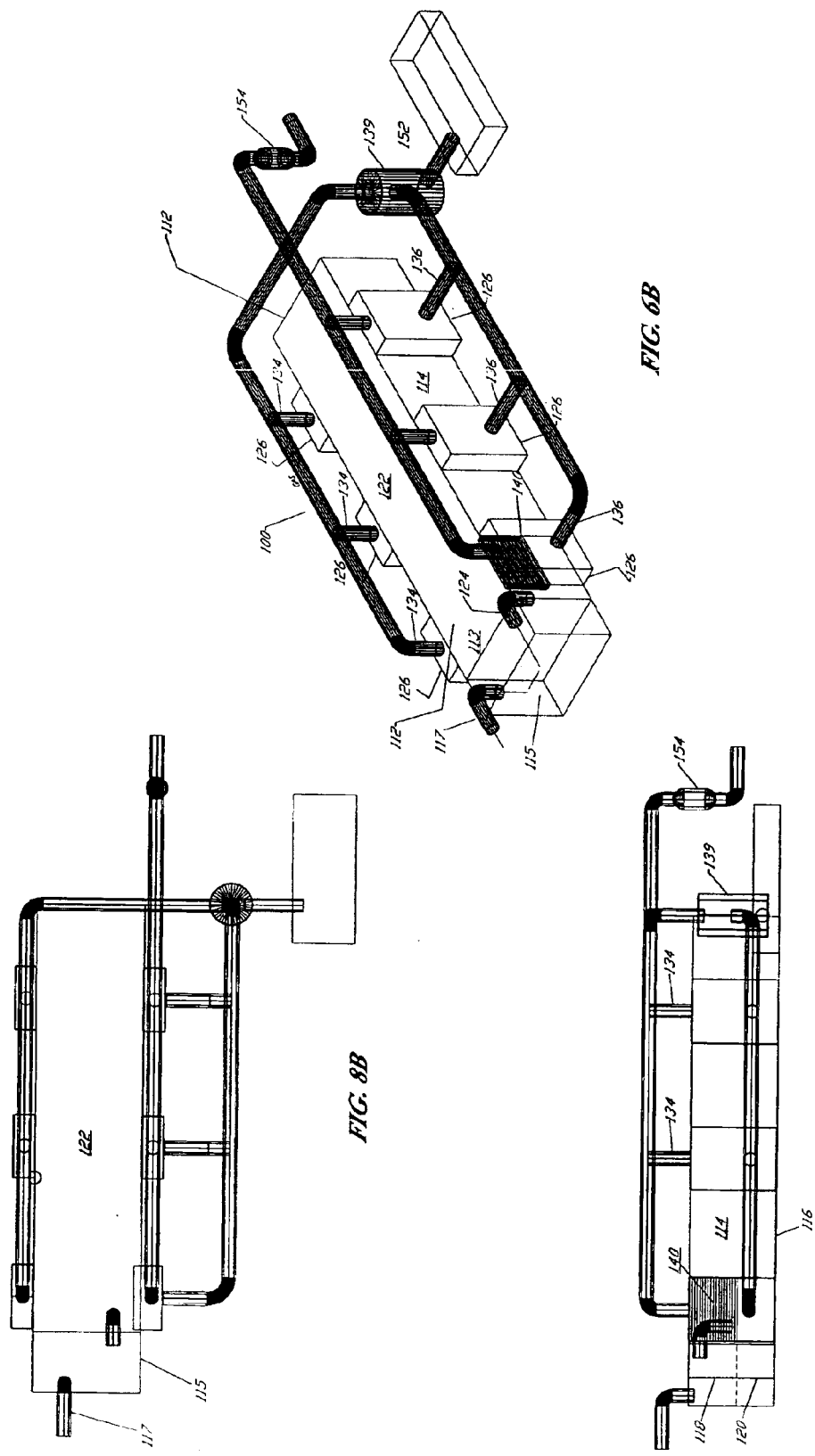

APPARATUS AND METHOD FOR PROCESSING ORGANIC MATERIALS

BACKGROUND OF THE INVENTION

The present invention generally relates to devices and methods for processing organic waste material which may be used in livestock operations such as dairies, feedlots, slaughterhouses, and food processing plants. More particularly, the present invention comprises a processing system for digesting animal excrement, food wastes and other organic waste material at atmospheric pressure resulting in combustible gas products and in materials which may be used for fertilizer or animal nutrients. A first embodiment of the disclosed apparatus allows a retention pond to be converted to a digester, thereby reducing the required initial capital investment. Among its other uses, a second embodiment of the disclosed apparatus may be used as a module in a system, where the system comprises a plurality of modules, allowing the operator to take one module out of operation without shutting down the entire waste processing system.

The use of anaerobic digesters for processing organic wastes is well known. There are two basic types of anaerobic digester, batch and continuous. In batch type digesters, the digester is loaded with organic materials, sealed for the digestion period, and then emptied when gas production stops. Once digestion is complete, the digested material, or effluent, may be removed from the digester and fresh organic material deposited. In continuous digesters, organic material is constantly fed into the digester. The material is pushed through the digester by either mechanical means or by the displacement action of new material pushing out effluent. There are three basic types of continuous digesters: vertical tank systems, horizontal or plug-flow systems and multiple tank systems.

Depending upon the particular embodiment, the disclosed apparatus comprises a horizontal digester which may be used either as a batch digester or as continuous digester. When utilized as a continuous digester, the apparatus comprises a hybrid between a plug-flow system and multiple tank system, because it may comprise multiple "tanks." In plug flow digesters, raw organic waste, or feedstock, is introduced into one end of the digester and effluent is removed from the other end. Over the course of time, which may be up to a period of weeks, the waste is anaerobically digested by anaerobic bacteria within the feedstock. The organic feedstock is broken down and one group of bacteria convert the decomposed matter into organic acids. A second group of bacteria, methanogenic bacteria, convert the organic acids into volatile gases such as methane, carbon, monoxide, nitrogen, oxygen and hydrogen sulfide. Some of these gases, methane in particular, have value as fuel gas. The remaining organic material, the effluent, may contain useful components such as ammonia, nitrogen, potassium and phosphorous. The effluent is discharged from the digester and further processed as necessary for disposal or for further use, such as for fertilizer or livestock feed additive.

Depending upon the method used, the required retention times for effective digestion can be relatively long, requiring a substantial storage capacity as the organic material is processed. For example, U.S. Pat. No. 4,750,454, by Santina et al., discloses a digester vessel 100 to 110 feet in length, 22 feet wide by 12 feet deep, allowing for a retention time of 15 to 20 days. Long retention times typically require large volume digester vessels. Such large vessels can present several disadvantages to the operator. For example, large vessels require a large initial capital outlay for the vessel. A large footprint and foundation are generally required for such vessels. Moreover, large digester vessels make future expansion problematic. A relatively small-sized facility which has future expansion plans must either presently invest in a system having initial excess capacity, or purchase a smaller system and retrofit as the need arises. Large vessels can also present operational difficulties. If a facility utilizes a single large digester vessel, the entire system must be shut down while maintenance is performed on the vessel. For example, non-organic solids, such as sand and gravel, may collect at the bottom of the vessel, which require that the digester vessel be periodically taken out of service so that the accumulated non-organic solids may be removed.

Many efforts have been made to increase the efficiency of anaerobic digesters and/or increase the process flow rates through the vessel to reduce the required retention time and thus reduce the size of the digester vessel. It has been recognized that digestion rates are reduced it there is a lack of bacteria necessary for complete digestion. Therefore, many of the approaches to increasing digester efficiency concentrate on maximizing the amount of bacteria within the digester vessel. Because anaerobic bacteria thrive at temperatures of about 98 degrees F. (mesophilic) and 130 degrees F. (thermophilic), one of the most common ways of optimizing digester efficiency is to maintain the temperature in either the mesophilic or thermophilic range. While maintaining the digester in the thermophilic range increases the decomposition rate and thus the biogas production rate from those achievable in the mesophilic range, operating the digester in the thermophilic range makes the digester more sensitive to changes in feedstock composition and temperature. Digesters operating in the mesophilic range are less sensitive to operational upsets than those operating in the thermophilic range.

In addition to controlling digester temperature, other methods of increasing digester efficiency are known. One such method is to recycle large volumes of effluents high in suspended bacterial biomass. However, because the increased flow volume increases the total required retention time, this method does not necessarily result in smaller digester vessels. Another approach attempts to control the wavelength of the ambient light in the vessel so as to irradiate the interior of the vessel with light having an optimal wavelength for cultivation of the biological biomass. Another approach is to provide the digester vessel with microbe support structures which provide large surface areas for the biomass material to become attached.

The different approaches for increasing digester efficiency can require complex digester vessels with elaborate requirements for vessel geometry, internal vessel design, piping, pumping, and heating. In addition, taking a digester vessel out of service for maintenance typically requires taking the entire processing system offline while repairs are made to the digester vessel and/or to its component parts.

SUMMARY OF THE INVENTION

The present invention is directed to an apparatus and method for processing organic materials which meets the needs identified above.

A first embodiment of the apparatus comprises a first covered fluid containment means, such as a retention pond covered with an oxygen impervious membrane, the first covered fluid containment means comprising a first upper section and a first lower section. In a batch type process, an aqueous slurry comprising anaerobically digestible fiber is disposed within the first covered containment means. Alternatively, the first covered fluid containment means may have a slurry inlet for receiving slurry for a continuous operation. A second covered fluid containment means, such as a cylindrical vessel, is disposed within or adjacent to the first covered containment means. The second covered fluid containment means comprises a second upper section and a second lower section. The second upper section comprises a first fluid inlet for receiving fluid flow from the first upper section of the first covered fluid containment means, where a screen is disposed at the interface of the first covered containment means and the second covered containment means, the screen adapted for formation of a filter cake thereon upon fluid flow from the first covered containment means through the first fluid inlet into the second covered containment means. For example, in the case of a covered retention pond, a cylindrical vessel might be placed within the pond, where the cylindrical vessel has an upper section with an opening, where a screen is disposed within or across the opening. The screen is sized such that a filter cake forms on the screen as fluid flows from the first covered fluid containment through the first fluid inlet into the second covered containment means. The filter cake comprises cellulose fiber components from the slurry, which plate out against the screen, while the liquid and gas components of the slurry flow into the second covered containment means.

The second covered containment means is divided into two vertical sections, an upper section and a lower section. The upper section of the second covered containment means comprises a first gas outlet, allowing free gas separated from the slurry to exit the second covered containment means. The lower section of the second covered containment means has a first liquid outlet, allowing liquid separated from the slurry to exit the second covered containment means.

The gas flowing from the first gas outlet flows into gas processing means which receive the gas and process the gas, such as drying the gas and/or removing undesirable constituents, such as hydrogen sulfide. The liquid flowing from the first liquid outlet flows into liquid processing means which may allow for further removal of gas and/or solids, and forward the remaining liquid for further treatment, use, or disposal.

The fluid containment means may comprise a first covered vessel. The first covered vessel comprises a first end, a second end, a first upper section and a first lower section. The aqueous slurry may be introduced into the first covered vessel on a batch basis, or the first covered vessel may have a first inlet located at the first end for receiving the aqueous slurry for a continuous operation. A second covered vessel which functions as the second covered containment means is disposed within or adjacent to the first covered vessel.

Also disclosed herein are methods of using the disclosed apparatus. These and other features, aspects, and advantages of the present invention will become better understood with regard to the following description, appended claims, and accompanying drawings.

BRIEF DESCRIPTION OF THE DRAWINGS

FIG. 6B is a perspective view of an embodiment of the disclosed digester, having separation vessels on the outside of the digestion vessel.

FIG. 7B is a side view of the embodiment of the digester shown in FIG. 6B.

FIG. 8B is a top view of the embodiment of the digester shown in FIG. 6B.

DETAILED DESCRIPTION OF THE EMBODIMENTS

Figure 1:
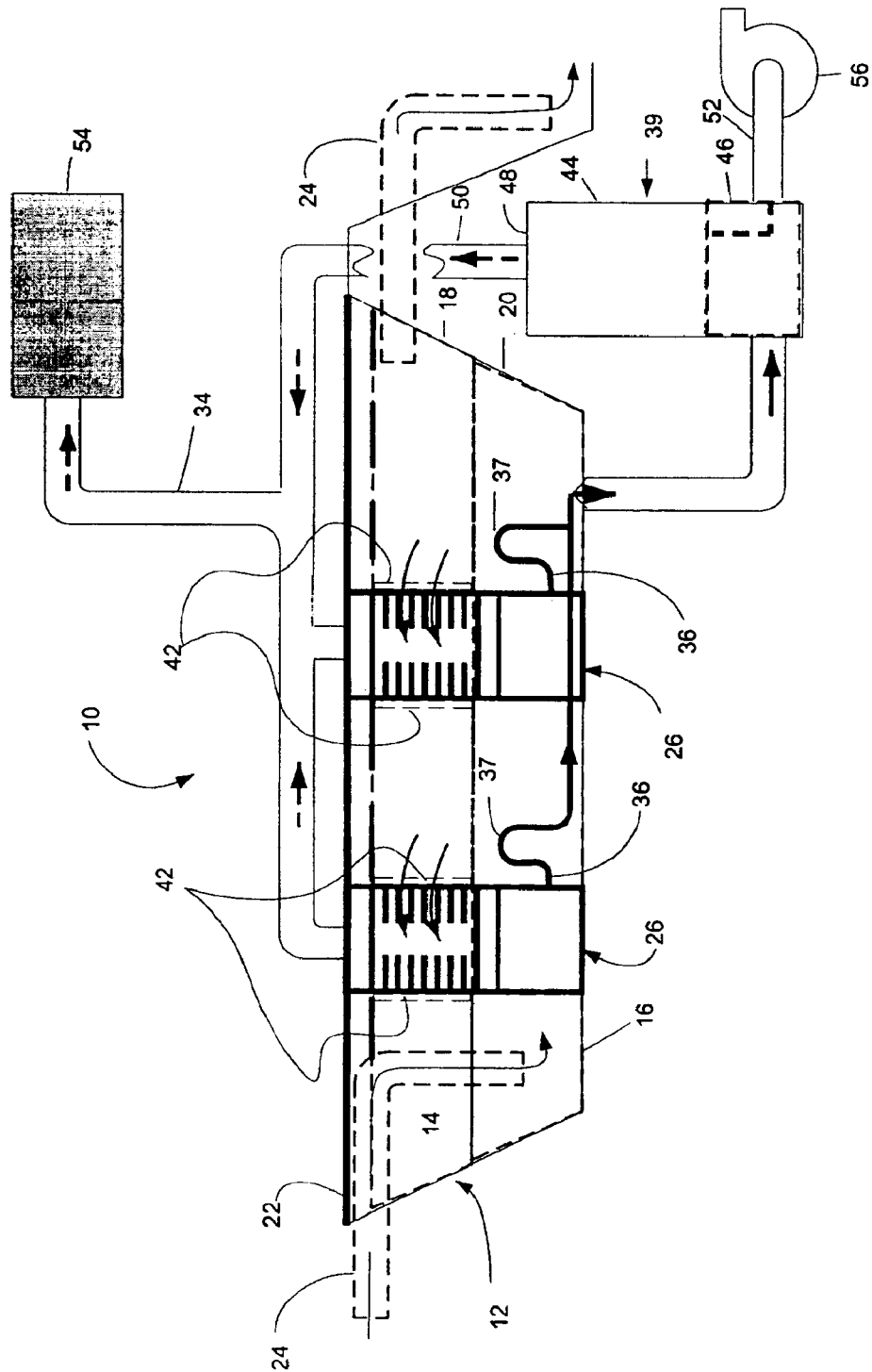
FIG. 1 is side view of an embodiment of the disclosed digester.

Referring now specifically to the drawings, FIG. 1 shows a first embodiment 10 of the disclosed apparatus. This embodiment comprises a first covered fluid containment means 12 (hereinafter referred to as the "first container"), such as one or more retention ponds, lagoons, or tanks commonly used in waste treatment facilities, food processing plants, dairies and other livestock operations, including facilities for horses, cattle, swine and poultry. As shown in FIG. 1, the first container 12 may comprise a generally rectangular structure having opposing side walls 14 and bottom 16. The first container further comprises a first upper section 18 and a first lower section 20.

If a tank or vessel is used for the first container 12, it may be buried if desired. If a tank or vessel is used for first container 12, hot water lines (not shown) may be placed in or along the walls of the vessel to maintain the temperature in the desired range, i.e., either mesophilic or thermophilic. The first container 12 is covered with a cover 22, such as an oxygen impervious membrane. An aqueous slurry comprising anaerobically digestible fiber is disposed within the first container 12, with the membrane 22 sealing over the first container. If necessary, venting means (not shown) may be required to allow the escape of oxygen from the first container 12 so that the anaerobic digestion process might proceed. In a continuous flow type process, the aqueous slurry may be introduced into the first container 12 through first slurry inlet 24 on a continuous basis. After the aqueous slurry is introduced into the first container 12, the slurry undergoes density separation, with the lighter density fibrous material, i.e., the digestible material, floating to the first upper section 18. The heavier liquids and inorganic solids, such as sand or gravel, accumulate at the first lower section 20 of the first container 12. This separation results in the first upper section 18 having a relatively higher solids content and the first lower section 20 having a relatively lower solids content. The disclosed apparatus is capable of processing aqueous slurries having solids (fiber) content ranging from 1–15 percent. Because ruminant animal manures typically have solids concentration of 11 percent to 13 percent, the disclosed apparatus is effective for processing cattle manure as well as other organic feedstock.

Figure 2:
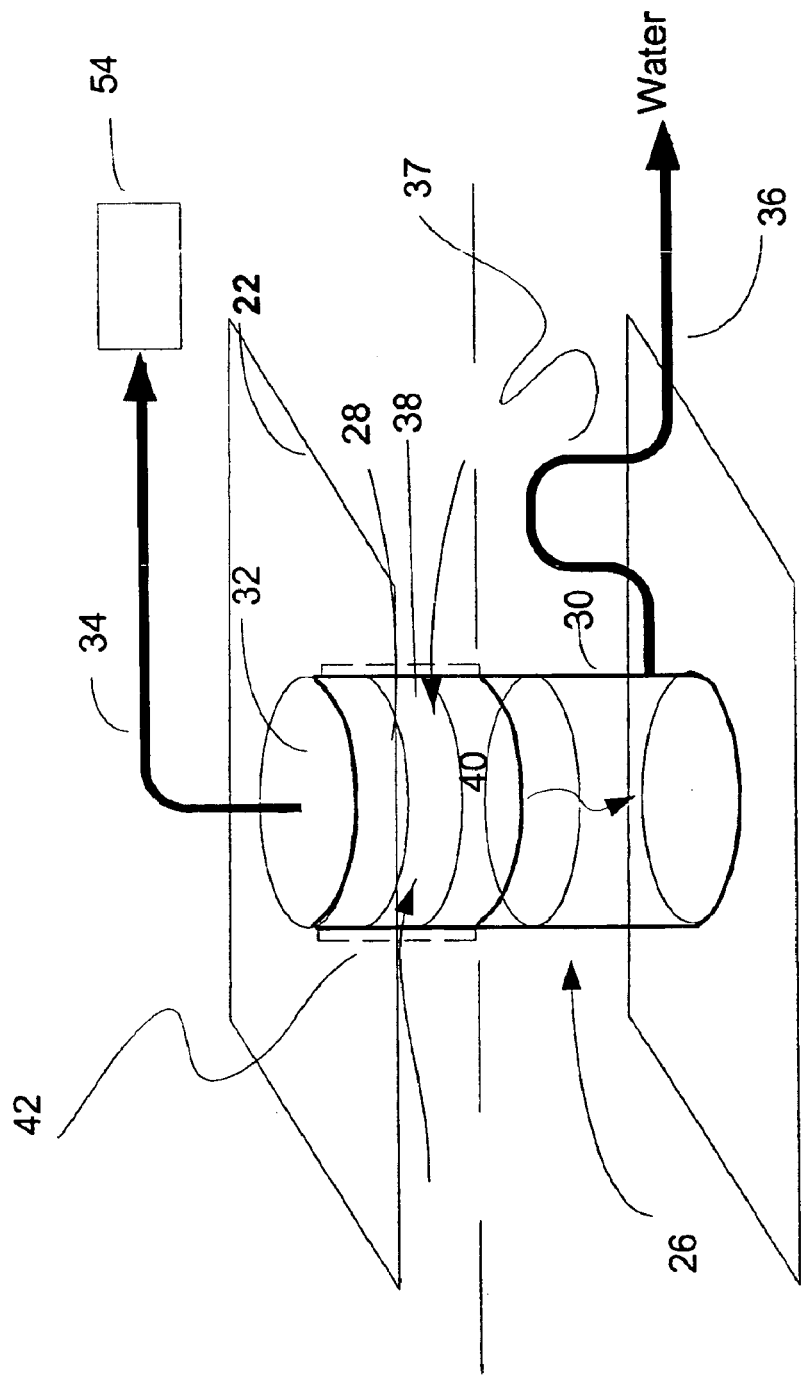
FIG. 2 is schematic of the second containment means disposed within the first containment means.

As shown in FIGS. 1 and 2, at least one second covered fluid containment means 26 (hereinafter referred to as the "second container") is disposed within the first container 12 or, alternatively, disposed adjacent to the first container 12. The second container 26 may be cylindrical in shape. However, it is to be appreciated that the second container 26 may be other shapes, having a rectangular, oval or elliptical cross-section, so long as the height of the second container is approximately the same as the maximum fluid level anticipated within the first container 12, as shown in FIG. 1. The second container 26 may also function as support means for membrane 22. The second container 26 may be fabricated from metal, plastic, concrete or composite materials.

As shown in FIG. 2, the second container 26 has an upper section (the second upper section) 28, a lower section (the second lower section) 30, and a covered top 32. The second upper section 28 of the second container 26 comprises a first fluid inlet 38 for receiving fluid flow from the first upper section 18 of the first container 12. The first fluid inlet 38 is a conduit for transmitting fluid, comprising gas and liquid, from the aqueous slurry disposed within the first container 12 into the second container 26. The first fluid inlet 38 may comprise a plurality of openings or holes in second upper section 28, or it may comprise one or more pipes into the second upper section 28 First fluid inlet 3g comprises a screen 40 which is disposed between the first container 12 and the second container 26, that is, at the interface of the first container and the second container. As shown in FIG. 2, the screen 40 may be attached over first fluid inlet 38. For example, if first fluid inlet 38 comprises a plurality of openings through the wall of the second container, screen 40 may be placed over the openings. Alternatively, if one or more conduits, such as pipes, are used for first fluid inlet 38, the screen 40 may be placed within or across each first fluid inlet.

It is desirable that screen 40 have a large surface area to allow for large flow across the screen, allowing the accumulation of a large volume of fiber solids against the screen. The openings in screen 40 should be small enough to prevent flow of the large pieces of solid fiber material into the second container 26. As fluid flows through screen 40, a filter cake 42 comprising the fiber materials is formed upon the screen. This filter cake 42 acts as a filter, such that the filter cake and screen 40 primarily allow only liquids and gas (as it is generated by digestion of the organic fiber) to enter into second container 26, retaining fibrous materials in the first container 12.

A first gas outlet 34 may be located in either the second upper section 28 or within the covered top 32. A first liquid outlet 36 is connected to the second lower section 30. The first liquid outlet 36 is configured so that it creates a loop seal 37, which serves to maintain a fixed liquid level in the second container 26, and prevents oxygen from getting into the system. Liquid is discharged from the second container 26 through the first liquid outlet 36 into liquid processing means, which may include a third covered containment means (the "third container") 39 where further separation of gas phase from liquid phase may occur. It should be appreciated that while FIG. 1 appears to show the third container 39 at a lower elevation than the second container 26, the third container would normally be at approximately the same elevation as the second container.

The third container 39 is divided into has an upper section (the third upper section) 44, a lower section (the "third lower section") 46, and a covered top 48. A gas outlet (the "second gas outlet") 50 may be located in either the third upper section 44 or within the covered top 48 of the third container 39. A liquid outlet (the "second liquid outlet") 52 is connected to the lower section 46. Gas from the third container 39 may be routed to gas processing means 54, such as a gas scrubber and/or gas sweetner. The nitrogen-rich liquid from the third container 39 may be routed for disposal or gathered for use as a cattle feed supplement or fertilizer.

Figure 3:
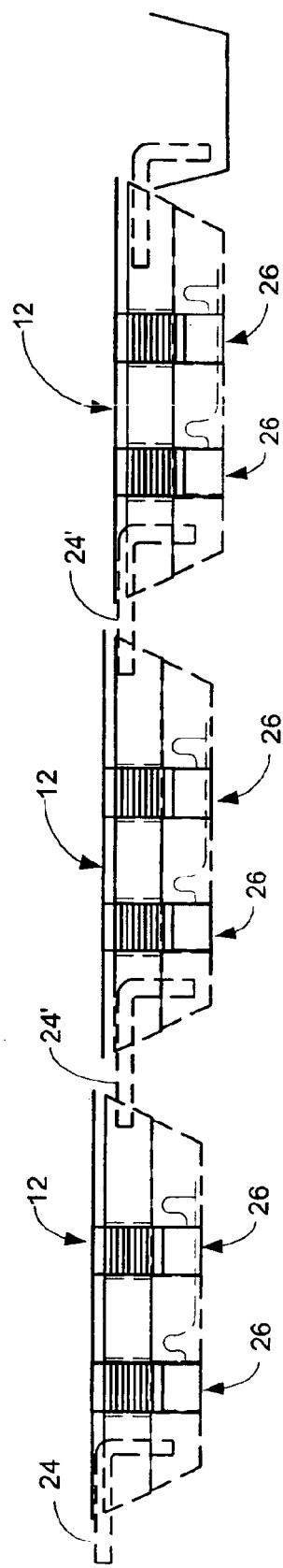
FIG. 3 shows covered containment ponds connected in series to comprise a digester system.

Circulating means, such as a pump 56, provides circulation of the aqueous slurry through the first covered container 12. Alternatively, as shown in FIG. 3, circulation through the first container may be achieved by connecting a plurality of first containers 12 in series, with each subsequent first container at a lower elevation to allow for gravity flow of the aqueous slurry. The aqueous slurry from each first container 12 is discharged through slurry outlet 24', which may also be the first slurry inlet for the next first container 12 in the series.

It is to be appreciated that a plurality of second containers 26 may be disposed within or adjacent to a single first container 12, allowing for progressive filtration of the aqueous slurry, such that the liquid content of the slurry decreases as the slurry moves from the inlet end of the first container, that is the end at which first slurry inlet 24 is located, to the opposing end where the slurry outlet 24' is located.

This first embodiment may have particular utility in converting existing retention ponds into digesters through relatively simple modifications. A cover 22, such as an oxygen impervious membrane, must be fabricated for the pond, which acts as the first container 12. Secondary containers 26, as described above, are disposed either within or adjacent to the pond. Circulating means, such as a pump 56, are hydraulically connected to the pond to cause the aqueous slurry to flow within the pond, creating a hydraulic gradient between the pond and the secondary container 26. Gas discharged from the secondary container 26 is routed to gas processing means 54 through a gas outlet 34 and liquids from the secondary container are routed to liquid processing means.

Figure 4:
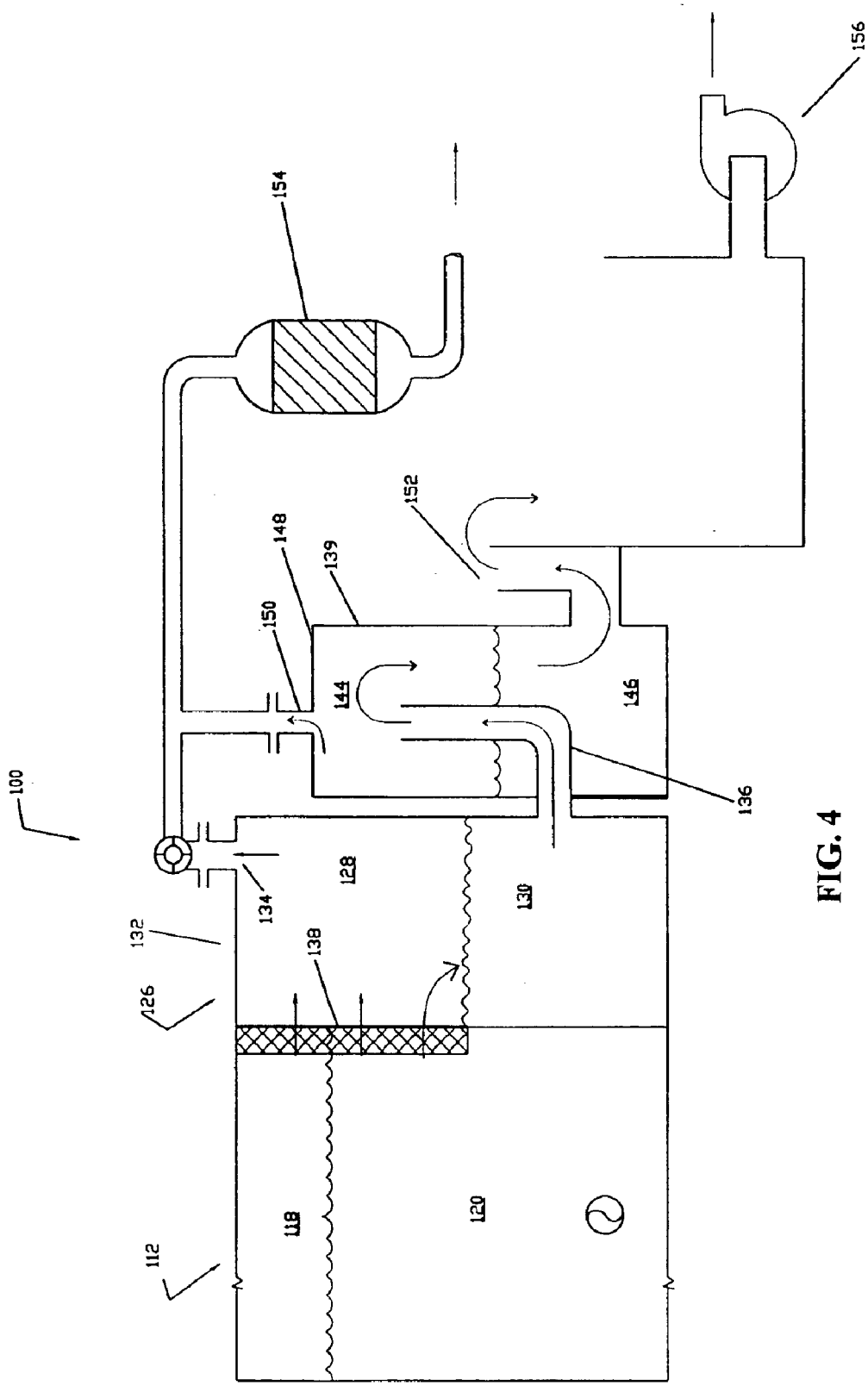
FIG. 4 shows a flow diagram through the fluid containment means.
Figure 5:
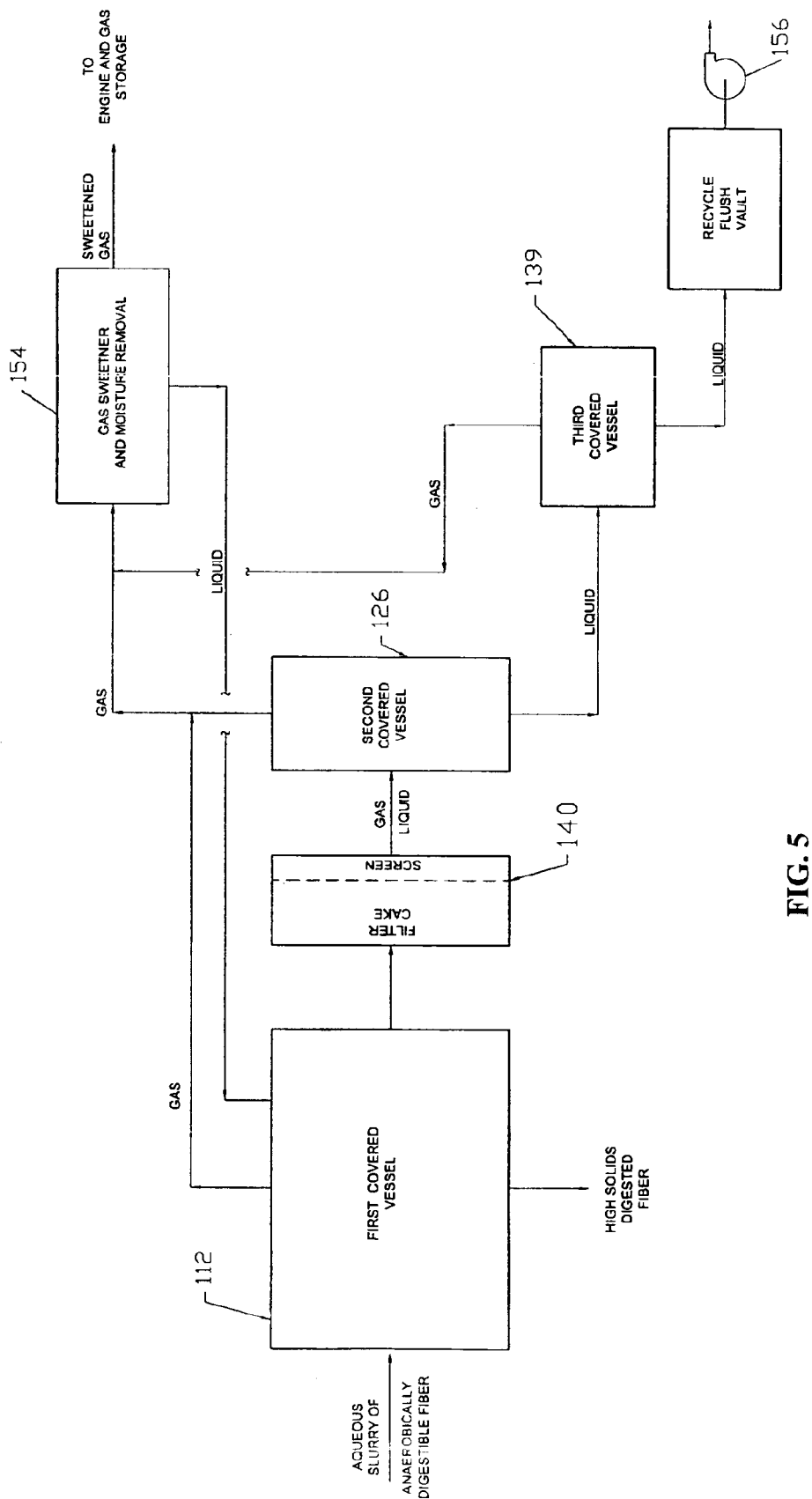
FIG. 5 shows a flow schematic through the fluid containment means.

A second embodiment 100 of the disclosed apparatus is shown in FIGS. 4–12. However, it is to be appreciated that the flow diagrams shown in FIGS. 4 and 5 are generally applicable to the first embodiment 10 regarding the relative positions of the containment means and the directions of flow.

Figures 6A, 7A, 8A:
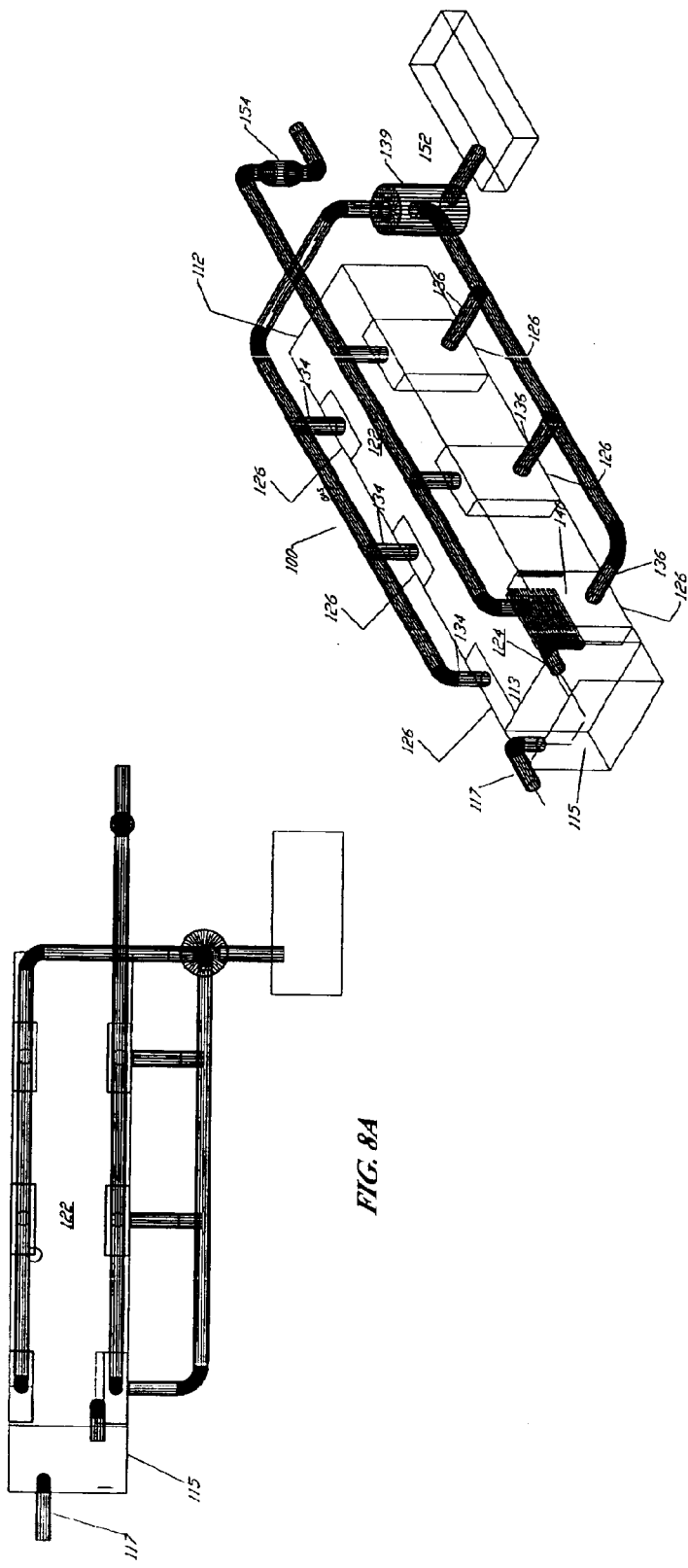
FIG. 6A is a perspective view of an embodiment of the disclosed digester having separation vessels on the inside of the digestion vessel.
FIG. 7A is a side view of the embodiment of the digester shown in FIG. 6A.
FIG. 8A is a top view of the embodiment of the digester shown in FIG. 6A.
Figure 9:
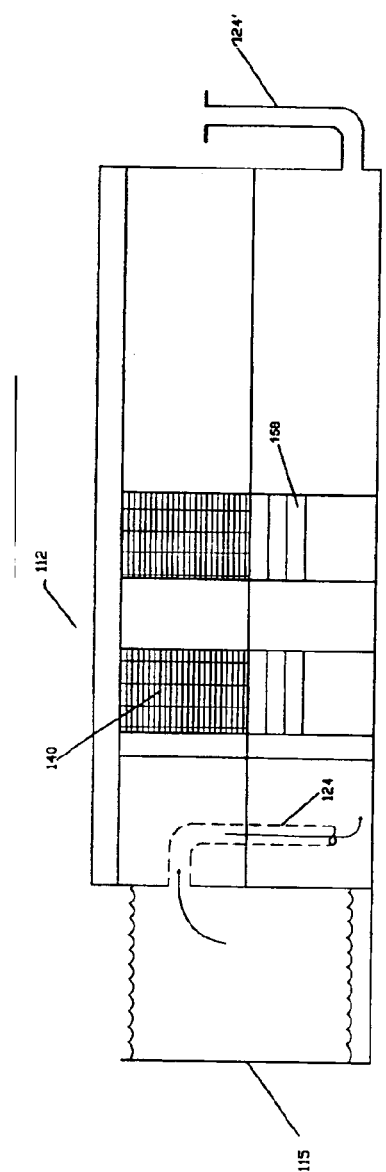
FIG. 9 schematically shows a side view of the first vessel of an embodiment of the disclosed digester.

The second embodiment 100 comprises a first covered vessel 112 (hereinafter referred to as the "first vessel"). As shown in FIGS. 6A and 6B, the first vessel 112 may comprise a generally rectangular structure having a first end 113, opposing side walls 114 and bottom 116. The first vessel 112 further comprises a first upper section 18 and a first lower section 120. First vessel 112 may be fabricated from steel, plastic, concrete or other material having the strength measures and corrosion resistance required for digester service as known by those skilled in the art. Hot water lines (not shown) may be placed in or along the walls 114 of first vessel 112 to maintain the temperature in the desired range, i.e., either mesophilic or thermophilic. The slurry entering the first vessel 112 may have a solids content ranging from one to fifteen percent. Because ruminant animal manures typically have solids concentration of 11 percent to 13 percent, the disclosed apparatus is effective for processing cattle manure as well as other organic feedstock. The first vessel 12 may also be referred to as the "digestion vessel," because much of the digestion will take place in this vessel.

The first vessel 112 is sealed at its top by cover 122. An aqueous slurry comprising anaerobically digestible fiber is disposed within the first vessel 112, with the cover 122 sealing the top of the first vessel. If necessary, venting means (not shown) may be required to allow the escape of oxygen from the first vessel 112 so that the anaerobic digestion process might proceed. In a continuous flow type process, the aqueous slurry may be introduced into the first vessel 112 on a continuous basis through first slurry inlet 124, which may be located at first end 113. After the aqueous slurry is introduced into the first vessel 112, the slurry undergoes density separation, with the lighter density fibrous material, i.e., the digestible material, floating to the top of the heavier liquids and inorganic solids, such as sand or gravel, accumulating at the bottom of the first container. This separation results in the first upper section 118 having a high solids content and the first lower section 120 having a lower solids content. The disclosed apparatus is capable of processing aqueous slurries having solids (fiber) content ranging from 1–15 percent. Because ruminant animal manures typically have solids concentration of 11 percent to 13 percent, the disclosed apparatus is effective for processing cattle manure as well as other organic feedstock.

The second embodiment 100 may have a surge tank 115 which receives an aqueous organic slurry from slurry source 117. Although FIGS. 6A and 6B depict the surge tank 115 attached at first end 113 as an integral part of the first vessel 112, it is to be appreciated that the surge tank 115 may be a separate vessel or other slurry storage means. Because digestion does not take place in the surge tank 115, it is not necessary that this vessel be covered and sealed from oxygen.

Figure 11:
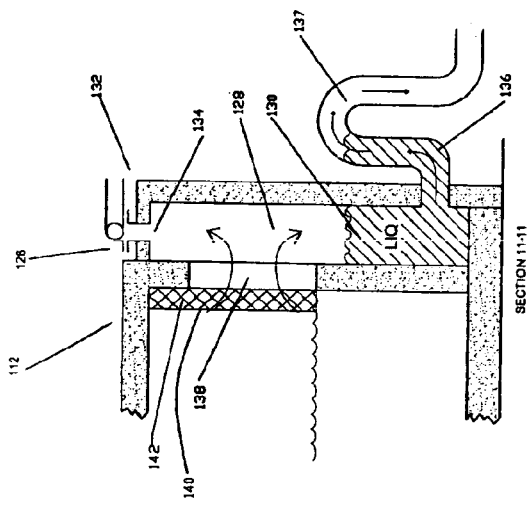
FIG. 11 shows a cross-section along line 11—11 from FIG. 10.
Figure 10:
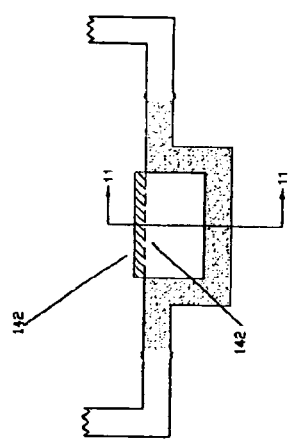
FIG. 10 schematically shows a top view of the interface between the first vessel and the second vessel.

As shown in FIGS. 6A, 7A, and 8A, at least one second covered vessel 126 (hereinafter referred to as the "second vessel") is disposed within the first vessel 112. Alternatively, as shown in FIGS. 6B, 7B, and 8B, the second vessel may be disposed adjacent to the first vessel 112. The second vessel 126 may be rectangular in shape as shown in FIGS. 6A and 6B. However, it is to be appreciated that the second container 126 may be other shapes, having a cylindrical, oval or elliptical cross-section, so long as the height of the second vessel is approximately the same as the maximum fluid level anticipated within the first vessel 112, as shown in FIGS. 4 and 11. The second container 126 may be fabricated from metal, plastic, concrete or composite materials.

As shown in FIGS. 4 and 11, the second vessel 126 has an upper section (the second upper section) 128, a lower section (the second lower section) 130, and a covered top 132. The second upper section 128 of the second vessel 126 comprises a first fluid inlet 138 for receiving fluid flow from the first upper section 118 of the first vessel 112. The first fluid inlet 138 is a conduit for transmitting fluid, comprising gas and liquid, from the aqueous slurry disposed within the first vessel 112 into the second vessel 126. The first fluid inlet 138 may comprise a plurality of openings or holes in upper section 128, or it may comprise one or more pipes or conduits into the second upper section 128 of the second vessel 126. First fluid inlet 138 comprises a screen 140 which is disposed between the first vessel 112 and the second vessel 126, that is, at the interface of the first vessel and the second vessel. The screen 140 may be attached over first fluid inlet 138. For example, if first fluid inlet 138 comprises a plurality of openings through the wall of the second vessel 126, screen 140 may be placed over the openings. Alternatively, if one or more conduits, such as pipes, are used for first fluid inlet 138, the screen 140 may be placed within or across the first fluid inlet.

It is desirable that screen 140 have a large surface area to allow for large flow across the screen, allowing the accumulation of a large volume of biomass against the screen. The openings in screen 140 should be small enough to prevent flow of the large pieces of solid fiber material into the second vessel 126. As fluid flows through screen 140, a filter cake 142 comprising the fiber materials is formed upon the screen. This filter cake 142 acts as a further filter, such that the filter cake and screen 140 primarily allow only liquids and gas (as it is generated by digestion of the organic fiber) to enter into second vessel 126, retaining fibrous materials in the first vessel 112.

A first gas outlet 134 may be located in either the second upper section 128 or within the covered top 132 of second vessel 126. A first liquid outlet 136 is connected to the lower section 130. As shown in FIG. 11, the first liquid outlet 136 may be configured so that it creates a loop seal 137, which serves to maintain a fixed liquid level in the second vessel 126, and prevents oxygen from getting into the system. Liquid is discharged from the second vessel 126 through the first liquid outlet 136 into liquid processing means, including a third covered vessel (hereinafter the "third vessel") 139 where further separation of the gas phase from the liquid phase may occur. The second vessel 126 may also be referred to as the "separation vessel" because the liquid and gas in this vessel are routed to different processing or storage means.

The third vessel 139 is divided into has an upper section (the third upper section) 144, a lower section (the third lower section) 146, and a covered top 148. A gas outlet (the "second gas outlet") 150 may be located in either the upper section 144 or within the covered top 148 of the third vessel 139. A liquid outlet (the "second liquid outlet") 152 is connected to the third lower section 146. Gas from the third vessel 139 may be routed to gas processing means 154, such as a gas scrubber and/or gas sweetner, which may be required because of hydrogen sulfide in the gas. The nitrogen-rich liquid from the third vessel 139 may be routed for disposal or gathered for use as a cattle feed supplement or fertilizer.

Circulating means, such as pump 156, provide circulation of the aqueous slurry through the first covered vessel 112. Alternatively, circulation through the first vessel 112 may be achieved by creating a gravity gradient. The gravity gradient may be created by elevating the first end 113 of the vessel with respect to the rest of the first vessel or by having a series of first vessels 112, with each successive vessel at a lower elevation, and aqueous slurry exiting through first slurry outlet 124', which may also act as the first slurry inlet 124 for the next first vessel 112 in the series. The level of the first vessel 112 may be adjusted through adjustable weir 158, which allows fluid within the first container to flow into second vessel 126.

It is to be appreciated that a plurality of second containers 126 may be disposed within or adjacent to a single first container 112, allowing for progressive filtration of the aqueous slurry.

Figure 12:
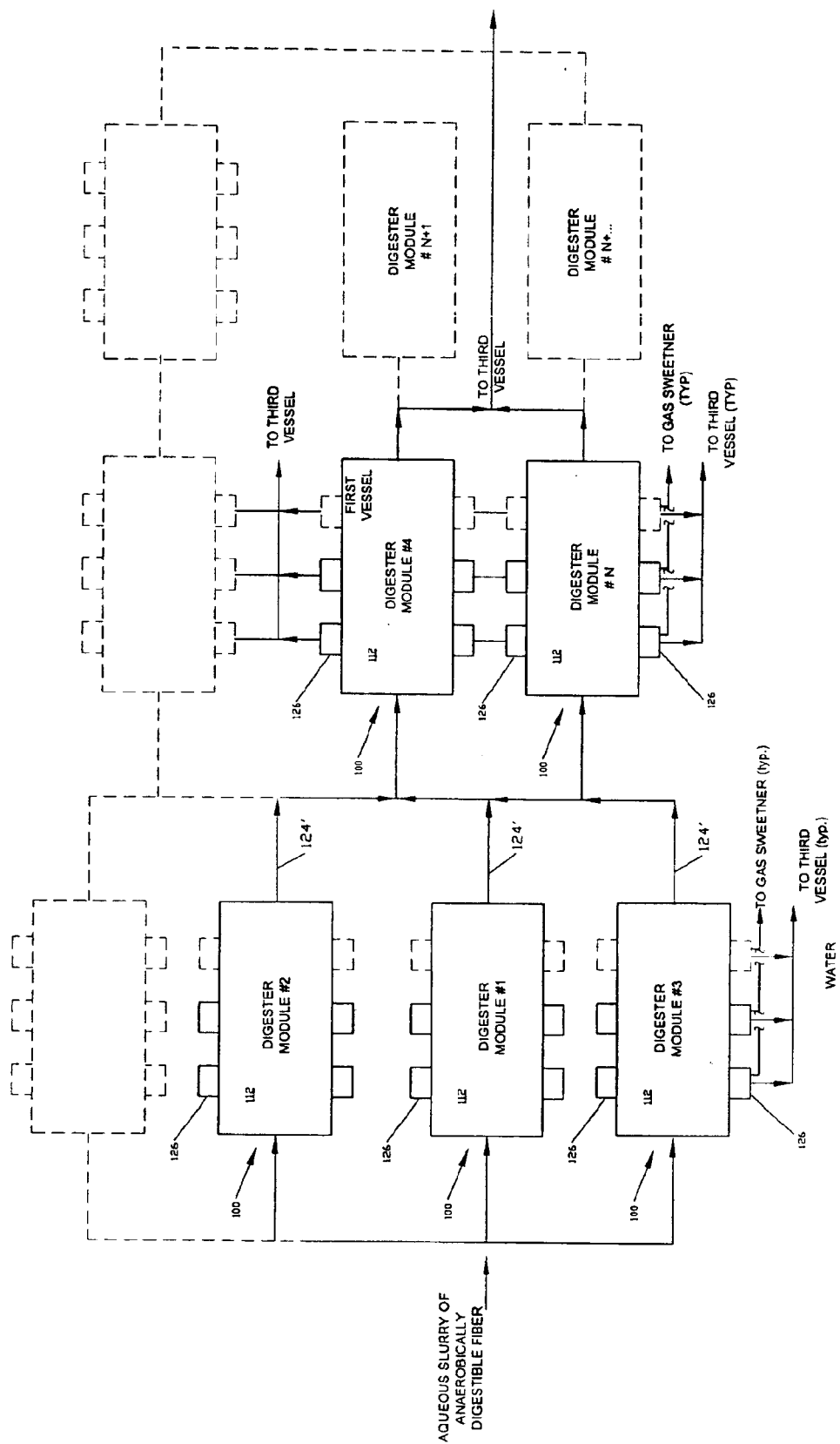
FIG. 12 schematically illustrates a plurality of digester modules connected in parallel and in series.

FIG. 12 shows how a digester system may comprise a plurality of the second embodiment 100 of the apparatus, each of this embodiment comprising a digester module. The digester modules may be connected in parallel and/or in series. In such case, each module substantially comprises the same components as discussed above for the second embodiment. The gas and liquids from the second vessel 126 of each module may be routed to common gas processing means and liquid processing means through the use of common piping and manifolds as know in the art. The aqueous slurry from a first module in the system may exit the first module through a first slurry outlet 124', which may transfer the aqueous slurry into the succeeding module in the series. It is to be appreciated that connecting the digester modules in parallel has the effect of having a wider digester vessel and connecting the digester modules in series has the effect of having a longer digester vessel. A digester system comprising a single digester module may therefore be expanded by adding additional modules in parallel or in series, essentially enlarging the effective width and/or effective length of the digester.

A digester system comprising a plurality of digester modules has several advantages. For example, the disclosed system allows the operator to perform maintenance on a single module without shutting in the entire digester system.

It allows the system to grow as required by the needs of the facility. A facility might start off with a small number of modules and increase the capacity of the facility as the need arises, as opposed to initially over-designing the capacity of the facility.

While the above is a description of various embodiments of the present invention, further modifications may be employed without departing from the spirit and scope of the present invention. For example, the size, shape, position and/or material of the various components may be changed as desired. Thus the scope of the invention should not be limited by the specific structures disclosed. Instead the true scope of the invention should be determined by the following claims.

What is claimed is:

1. An anaerobic digester comprising:
   a first covered fluid containment means comprising a first upper section and a first lower section, an aqueous slurry comprising anaerobically digestible fiber disposed within the first covered containment means;
   a second covered fluid containment means disposed within the first covered containment means, the second covered fluid containment means comprising a second upper section and a second lower section;
   the second upper section comprising a first fluid inlet for receiving fluid flow from the first upper section of the first covered fluid containment means, the first fluid inlet having a screen disposed at the interface of the first covered fluid containment means and the second covered fluid containment means, the screen adapted for formation of a filter cake thereon upon fluid flow from the first covered fluid containment means through the first fluid inlet into the second covered containment means, said filter cake comprising said fiber;
   said second upper section comprising a first gas outlet and said second lower section comprising a first liquid outlet;
   circulating means for circulating the aqueous slurry through the first covered fluid containment means;
   gas processing means for receiving and processing gas from the first gas outlet; and
   liquid processing means for receiving liquid from the first liquid outlet.

2. The anaerobic digester of claim 1 wherein the first covered containment means comprises a pond covered with a membrane, the membrane impervious to oxygen flow.

3. The anaerobic digester of claim 1 wherein the second covered fluid containment means comprises a cylindrical vessel.

4. The anaerobic digester of claim 1 wherein the first liquid outlet comprises a loop seal for controlling the fluid level in the second covered fluid containment means.

5. The anaerobic digester of claim 1 wherein the gas processing means for receiving and processing gas from the first gas outlet comprises a gas scrubbing system.

6. The anaerobic digester of claim 1 wherein the liquid processing means for receiving liquid from the first liquid outlet comprises a third covered fluid containment means hydraulically connected to the first liquid outlet.

7. The anaerobic digester of claim 6 wherein the third covered fluid containment means comprises a third upper section and a third lower section.

8. The anaerobic digester of claim 7 wherein the third upper section comprises a second gas outlet and the third lower section comprises a second liquid outlet.

9. An anaerobic digester comprising:

a first covered fluid containment means comprising a first upper section and a first lower section and a first slurry inlet for receiving an aqueous slurry comprising anaerobically digestible fiber, a second covered fluid containment means disposed within the first covered containment means, the second covered fluid containment means comprising a second upper section and a second lower section;

the second upper section comprising a first fluid inlet for receiving fluid flow from the first upper section of the first covered fluid containment means, the first fluid inlet having a screen disposed at the interface of the first covered fluid containment means and the second covered fluid containment means, the screen adapted for formation of a filter cake thereon upon fluid flow from the first covered fluid containment means through the first fluid inlet into the second covered containment means, said filter cake comprising said fiber;

said second upper section comprising a first gas outlet and said second lower section comprising a first liquid outlet;

circulating means for circulating the aqueous slurry through the first covered fluid containment means;

gas processing means for receiving and processing gas from the first gas outlet; and liquid processing means for receiving liquid from the first liquid outlet.

10. The anaerobic digester of claim 9 wherein the first covered containment means comprises a pond covered with a membrane, the membrane impervious to oxygen flow.

11. The anaerobic digester of claim 9 wherein the second covered fluid containment means comprises a cylindrical vessel.

12. The anaerobic digester of claim 9 wherein the first liquid outlet comprises a loop seal for controlling the fluid level in the second covered fluid containment means.

13. The anaerobic digester of claim 9 wherein the gas processing means for receiving and processing gas from the first gas outlet comprises a gas scrubbing system.

14. The anaerobic digester of claim 9 wherein the liquid processing means for receiving liquid from the first liquid outlet comprises a third covered fluid containment means hydraulically connected to the first liquid outlet.

15. The anaerobic digester of claim 14 wherein the third covered fluid containment means comprises a third upper section and a third lower section.

16. The anaerobic digester of claim 15 wherein the third upper section comprises a second gas outlet and the third lower section comprises a second liquid outlet.

17. An anaerobic digester comprising:

a first covered fluid containment means comprising a first upper section and a first lower section, an aqueous slurry comprising anaerobically digestible fiber disposed within the first covered containment means;

a second covered fluid containment means disposed adjacent to the first covered containment means, the second covered fluid containment means comprising a second upper section and a second lower section;

the second upper section comprising a first fluid inlet for receiving fluid flow from the first upper section of the first covered fluid containment means, the first fluid inlet having a screen disposed at the interface of the first covered fluid containment means and the second covered fluid containment means, the screen adapted for formation of a filter cake thereon upon fluid flow from the first covered fluid containment means through the first fluid inlet into the second covered containment means, said filter cake comprising said fiber;

said second upper section comprising a first gas outlet and said second lower section comprising a first liquid outlet;

circulating means for circulating the aqueous slurry through the first covered fluid containment means;

gas processing means for receiving and processing gas from the first gas outlet; and liquid processing means for receiving liquid from the first liquid outlet.

18. The anaerobic digester of claim 17 wherein the first covered containment means comprises a pond covered with a membrane, the membrane impervious to oxygen flow.

19. The anaerobic digester of claim 17 wherein the second covered fluid containment means comprises a cylindrical vessel.

20. The anaerobic digester of claim 17 wherein the first liquid outlet comprises a loop seal for controlling the fluid level in the second covered fluid containment means.

21. The anaerobic digester of claim 17 wherein the gas processing means for receiving and processing gas from the first gas outlet comprises a gas scrubbing system.

22. The anaerobic digester of claim 17 wherein the liquid processing means for receiving liquid from the first liquid outlet comprises a third covered fluid containment means hydraulically connected to the first liquid outlet.

23. The anaerobic digester of claim 22 wherein the third covered fluid containment means comprises a third upper section and a third lower section.

24. The anaerobic digester of claim 23 wherein the third upper section comprises a second gas outlet and the third lower section comprises a second liquid outlet.

25. An anaerobic digester comprising:

a first covered fluid containment means comprising a first upper section and a first lower section and a first slurry inlet for receiving an aqueous slurry comprising anaerobically digestible fiber;

a second covered fluid containment means disposed adjacent to the first covered containment means, the second covered fluid containment means comprising a second upper section and a second lower section;

the second upper section comprising a first fluid inlet for receiving fluid flow from the first upper section of the first covered fluid containment means, the first fluid inlet having a screen disposed at the interface of the first covered fluid containment means and the second covered fluid containment means, the screen adapted for formation of a filter cake thereon upon fluid flow from the first covered fluid containment means through the first fluid inlet into the second covered containment means, said filter cake comprising said fiber;

said second upper section comprising a first gas outlet and said second lower section comprising a first liquid outlet;

circulating means for circulating the aqueous slurry through the first covered fluid containment means;

gas processing means for receiving and processing gas from the first gas outlet; and liquid processing means for receiving liquid from the first liquid outlet.

26. The anaerobic digester of claim 25 wherein the first covered containment means comprises a pond covered with a membrane, the membrane impervious to oxygen flow.

27. The anaerobic digester of claim 25 wherein the second covered fluid containment means comprises a cylindrical vessel.

28. The anaerobic digester of claim 25 wherein the first liquid outlet comprises a loop seal for controlling the fluid level in the second covered fluid containment means.

29. The anaerobic digester of claim 25 wherein the gas processing means for receiving and processing gas from the first gas outlet comprises a gas scrubbing system.

30. The anaerobic digester of claim 25 wherein the liquid processing means for receiving liquid from the first liquid outlet comprises a third covered containment means hydraulically connected to the first liquid outlet.

31. The anaerobic digester of claim 30 wherein the third covered containment means comprises a third upper section and a third lower section.

32. The anaerobic digester of claim 31 wherein the third upper section comprises a second gas outlet and the third lower section comprises a second liquid outlet.

33. An anaerobic digester comprising:
a first covered vessel comprising a first end and a second end, a first upper section and a first lower section, an aqueous slurry comprising anaerobically digestible fiber disposed within the first covered vessel;
a second covered vessel disposed within the first covered vessel, the second covered vessel comprising a second upper section and a second lower section;
the second upper section comprising a first fluid inlet for receiving fluid flow from the first upper section of the first covered vessel, the first fluid inlet having a screen disposed at the interface of the first covered vessel and the second covered vessel, the screen adapted for formation of a filter cake thereon upon fluid flow from the first covered vessel through the first fluid inlet into the second covered vessel, said filter cake comprising said fiber;
said second upper section comprising a first gas outlet and said second lower section comprising a first liquid outlet;
circulating means for circulating the aqueous slurry through the first covered vessel;
gas processing means for receiving and processing gas from the first gas outlet; and
liquid processing means for receiving liquid from the first liquid outlet.

34. The anaerobic digester of claim 33 wherein the first covered vessel is rectangular.

35. The anaerobic digester of claim 33 wherein the aqueous slurry comprises 1 to 15 percent solids.

36. The anaerobic digester of claim 33 wherein the gas processing means for receiving and processing gas from the first gas outlet comprises a gas scrubbing system.

37. The anaerobic digester of claim 33 wherein the liquid processing means for receiving liquid from the first liquid outlet comprises a third covered vessel hydraulically connected to the first liquid outlet.

38. The anaerobic digester of claim 37 wherein the third covered vessel comprises a third upper section and a third lower section.

39. The anaerobic digester of claim 38 wherein the third upper section comprises a second gas outlet and the third lower section comprises a second liquid outlet.

40. An anaerobic digester comprising:
a first covered vessel comprising a first end and a second end, a first upper section and a first lower section and a first slurry inlet for receiving an aqueous slurry comprising anaerobically digestible fiber;
a second covered vessel disposed within the first covered vessel, the second covered vessel comprising a second upper section and a second lower section;
the second upper section comprising a first fluid inlet for receiving fluid flow from the first upper section of the first covered vessel, the first fluid inlet having a screen disposed at the interface of the first covered vessel and the second covered vessel, the screen adapted for formation of a filter cake thereon upon fluid flow from the first covered vessel through the first fluid inlet into the second covered vessel, said filter cake comprising said fiber;
said second upper section comprising a first gas outlet and said second lower section comprising a first liquid outlet;
circulating means for circulating the aqueous slurry through the first covered vessel;
gas processing means for receiving and processing gas from the first gas outlet; and
liquid processing means for receiving liquid from the first liquid outlet.

41. The anaerobic digester of claim 40 wherein the first covered vessel is rectangular.

42. The anaerobic digester of claim 40 wherein the aqueous slurry comprises 1 to 15 percent solids.

43. The anaerobic digester of claim 40 wherein the gas processing means for receiving and processing gas from the first gas outlet comprises a gas scrubbing system.

44. The anaerobic digester of claim 40 wherein the liquid processing means for receiving liquid from the first liquid outlet comprises a third covered vessel hydraulically connected to the first liquid outlet.

45. The anaerobic digester of claim 44 wherein the third covered vessel comprises a third upper section and a third lower section.

46. The anaerobic digester of claim 45 wherein the third upper section comprises a second gas outlet and the third lower section comprises a second liquid outlet.

47. An anaerobic digester comprising:
a first covered vessel comprising a first end and a second end, a first upper section and a first lower section, an aqueous slurry comprising anaerobically digestible fiber disposed within the first covered vessel;
a second covered vessel disposed adjacent to the first covered vessel, the second covered vessel comprising a second upper section and a second lower section;
the second upper section comprising a first fluid inlet for receiving fluid flow from the first upper section of the first covered vessel, the first fluid inlet having a screen disposed between the first covered vessel and the second covered vessel, the screen adapted for formation of a filter cake thereon upon fluid flow from the first covered vessel through the first fluid inlet into the second covered vessel, said filter cake comprising said fiber;

said second upper section comprising a first gas outlet and said second lower section comprising a first liquid outlet;

circulating means for circulating the aqueous slurry through the first covered vessel;

gas processing means for receiving and processing gas from the first gas outlet; and liquid processing means for receiving liquid from the first liquid outlet.

48. The anaerobic digester of claim 47 wherein the first covered vessel is rectangular.

49. The anaerobic digester of claim 47 wherein the aqueous slurry comprises 1 to 15 percent solids.

50. The anaerobic digester of claim 47 wherein the gas processing means for receiving and processing gas from the first gas outlet comprises a gas scrubbing system.

51. The anaerobic digester of claim 47 wherein the liquid processing means for receiving liquid from the first liquid outlet comprises a third covered vessel hydraulically connected to the first liquid outlet.

52. The anaerobic digester of claim 51 wherein the third covered vessel comprises a third upper section and a third lower section.

53. The anaerobic digester of claim 52 wherein the third upper section comprises a second gas outlet and the third lower section comprises a second liquid outlet.

54. An anaerobic digester comprising:

a first covered vessel comprising a first end and a second end, a first upper section and a first lower section and a first slurry inlet for receiving an aqueous slurry comprising anaerobically digestible fiber;

a second covered vessel disposed adjacent to the first covered vessel, the second covered vessel comprising a second upper section and a second lower section;

the second upper section comprising a first fluid inlet for receiving fluid flow from the first upper section of the first covered vessel, the first fluid inlet having a screen disposed between the first covered vessel and the second covered vessel, the screen adapted for formation of a filter cake thereon upon fluid flow from the first covered vessel through the first fluid inlet into the second covered vessel, said filter cake comprising said fiber;

said second upper section comprising a first gas outlet and said second lower section comprising a first liquid outlet;

circulating means for circulating the aqueous slurry through the first covered vessel;

gas processing means for receiving and processing gas from the first gas outlet; and liquid processing means for receiving liquid from the first liquid outlet.

55. The anaerobic digester of claim 54 wherein the first covered vessel is rectangular.

56. The anaerobic digester of claim 54 wherein the aqueous slurry comprises 1 to 15 percent solids.

57. The anaerobic digester of claim 54 wherein the gas processing means for receiving and processing gas from the first gas outlet comprises a gas scrubbing system.

58. The anaerobic digester of claim 54 wherein the liquid processing means for receiving liquid from the first liquid outlet comprises a third covered vessel hydraulically connected to the first liquid outlet.

59. The anaerobic digester of claim 58 wherein the third covered vessel comprises a third upper section and a third lower section.

60. The anaerobic digester of claim 59 wherein the third upper section comprises a second gas outlet and the third lower section comprises a second liquid outlet.

61. An anaerobic digester system comprising:

a first digester module comprising:

a first covered vessel comprising a first end and a second end, a first upper section and a first lower section, a first slurry inlet at the first end for receiving an aqueous slurry comprising anaerobically digestible fiber and a first slurry outlet at the second end for discharging aqueous slurry;

a second covered vessel disposed adjacent to the first covered vessel, the second covered vessel comprising a second upper section and a second lower section;

the second upper section comprising a first fluid inlet for receiving fluid flow from the first upper section of the first covered vessel, the first fluid inlet having a screen disposed between the first covered vessel and the second covered vessel, the screen adapted for formation of a filter cake thereon upon fluid flow from the first covered vessel through the first fluid inlet into the second covered vessel, said filter cake comprising said fiber;

said second upper section comprising a first gas outlet and said second lower section comprising a first liquid outlet;

circulating means for circulating the aqueous slurry through the first covered vessel;

gas processing means for receiving and processing gas from the first gas outlet;

liquid processing means for receiving liquid from the first liquid outlet; and a second digester module comprising a fourth covered vessel comprising a second slurry inlet for receiving aqueous slurry from the first slurry outlet of the first digester module.

62. The anaerobic digester system of claim 61 wherein the first covered vessel of the first digester module is rectangular.

63. The anaerobic digester system of claim 61 wherein the fourth covered vessel of the second digester module is rectangular.

64. A method of processing an aqueous slurry comprising anaerobically digestible fiber, the method comprising the steps of:

(a) disposing the aqueous slurry into an anaerobic digester comprising: (i) a first covered fluid containment means comprising a first upper section and a first lower section; (ii) a second covered fluid containment means disposed within the first covered containment means, the second covered fluid containment means comprising a second upper section and a second lower section; (iii) the second upper section comprising a first fluid inlet for receiving fluid flow from the first upper section of the first covered fluid containment means, the first fluid inlet having a screen disposed between the first covered fluid containment means and the second covered fluid containment means, the screen adapted for formation of a filter cake thereon upon fluid flow from the first covered fluid containment means through the first fluid inlet into the second covered containment means, said filter cake comprising said fiber; (iv) said second upper section comprising a first gas outlet and said second lower section comprising a first liquid outlet; and (v) circulating means for circulating the aqueous slurry through the first covered fluid containment means;

(b) receiving gas from the first outlet means into a gas processing means for receiving and processing gas; and (c) receiving liquid from the first liquid outlet into a liquid processing means.

65. The method of claim 64 wherein the first covered containment means comprises a pond covered with a membrane, the membrane impervious to oxygen flow.

66. The method of claim 64 wherein the second covered fluid containment means comprises a cylindrical vessel.

67. The method of claim 64 wherein the first liquid outlet comprises a loop seal for controlling the fluid level in the second covered fluid containment means.

68. The method of claim 64 wherein the gas processing means for receiving and processing gas from the first gas outlet comprises a gas scrubbing system.

69. The method of claim 64 wherein the liquid processing means for receiving liquid from the first liquid outlet comprises a third covered fluid containment means hydraulically connected to the first liquid outlet.

70. The method of claim 69 wherein the third covered fluid containment means comprises a third upper section and a third lower section.

71. A method of processing an aqueous slurry comprising anaerobically digestible fiber, the method comprising the steps of:

(a) disposing the aqueous slurry comprising anaerobically digestible fiber into an anaerobic digester comprising:
(i) a first covered vessel comprising a first end and a second end, a first upper section and a first lower section; (ii) a second covered vessel disposed adjacent to the first covered vessel, the second covered vessel comprising a second upper section and a second lower section; (iii) the second upper section comprising a first fluid inlet for receiving fluid flow from the first upper section of the first covered vessel, the first fluid inlet having a screen disposed between the first covered vessel and the second covered vessel, the screen adapted for formation of a filter cake thereon upon fluid flow from the first covered vessel through the first fluid inlet into the second covered vessel, said filter cake comprising said fiber; (iv) said second upper section comprising a first gas outlet and said second lower section comprising a first liquid outlet; and (v) circulating means for circulating the aqueous slurry through the first covered vessel;

(b) receiving gas from the first gas outlet means into a gas processing means for receiving processing gas; and (c) receiving liquid from the first liquid outlet into a liquid processing means.

72. The method of claim 71 wherein the first covered vessel is rectangular.

73. The method of claim 71 wherein the aqueous slurry comprises 1 to 15 percent solids.

74. The method of claim 71 wherein the gas processing means for receiving and processing gas from the first gas outlet comprises a gas scrubbing system.

75. The method of claim 71 wherein the liquid processing means for receiving liquid from the first liquid outlet comprises a third covered fluid containment means hydraulically connected to the first liquid outlet.

76. The method of claim 75 wherein the third covered fluid containment means comprises a third upper section and a third lower section.

* * * * *